US008958022B2

(12) United States Patent
Youk et al.

(10) Patent No.: US 8,958,022 B2
(45) Date of Patent: Feb. 17, 2015

(54) LIQUID CRYSTAL DISPLAY DEVICE INCLUDING BACKLIGHT UNIT

(75) Inventors: Shim-Keun Youk, Seoul (KR); Dong-Nyuek Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/193,896

(22) Filed: Jul. 29, 2011

(65) Prior Publication Data
US 2012/0026424 A1    Feb. 2, 2012

(30) Foreign Application Priority Data

Jul. 30, 2010  (KR) .................. 10-2010-0074126

(51) Int. Cl.
*G02F 1/1333* (2006.01)
*F21V 8/00* (2006.01)

(52) U.S. Cl.
CPC ............ *G02B 6/0083* (2013.01); *G02B 6/0085* (2013.01); *G02B 6/009* (2013.01)
USPC ............................................ 349/58; 349/161

(58) Field of Classification Search
USPC .................................................... 349/58, 161
See application file for complete search history.

(56) References Cited

U.S. PATENT DOCUMENTS

| 7,545,461 | B2 | 6/2009 | Kondo et al. | |
|---|---|---|---|---|
| 7,599,020 | B2 * | 10/2009 | Yang | 349/150 |
| 7,667,378 | B2 * | 2/2010 | Sakai | 313/46 |
| 7,894,016 | B2 * | 2/2011 | Hamada | 349/58 |
| 8,164,704 | B2 * | 4/2012 | Kim et al. | 349/58 |
| 8,279,372 | B2 * | 10/2012 | Shimura et al. | 349/65 |
| 8,441,608 | B2 * | 5/2013 | Heo et al. | 349/161 |
| 2008/0149373 | A1 * | 6/2008 | Kim et al. | 174/255 |
| 2009/0290088 | A1 | 11/2009 | Kwak | |
| 2010/0007817 | A1 * | 1/2010 | Kim | 349/60 |
| 2010/0188607 | A1 * | 7/2010 | Park et al. | 349/62 |
| 2011/0043721 | A1 * | 2/2011 | Hwang et al. | 349/58 |
| 2011/0102726 | A1 * | 5/2011 | Nobeoka et al. | 349/150 |
| 2011/0122339 | A1 * | 5/2011 | Hamada | 349/62 |
| 2011/0273631 | A1 * | 11/2011 | Hayashi | 348/790 |
| 2013/0258251 | A1 * | 10/2013 | Lee et al. | 349/69 |

FOREIGN PATENT DOCUMENTS

| CN | 101625464 A | | 1/2010 |
|---|---|---|---|
| WO | WO 2010016322 A1 | * | 2/2010 |
| WO | 2010/082377 A1 | | 7/2010 |

* cited by examiner

*Primary Examiner* — Edward Glick
*Assistant Examiner* — Mark Teets
(74) *Attorney, Agent, or Firm* — McKenna Long & Aldridge LLP (57) ABSTRACT

A liquid crystal display device includes: a main frame having a rectangular ring shape; a reflecting plate on the main frame; a light guide plate on the reflecting plate; a light emitting diode (LED) assembly along at least one side of the main frame, the LED assembly having a plurality of LEDs and an LED printed circuit board (PCB), the LED PCB including a first portion having the plurality of LEDs thereon and a second portion perpendicular to the first portion; an LED housing contacting the LED PCB; a plurality of optical sheets on the light guide plate; a liquid crystal panel on the plurality of optical sheets; a bottom frame under the reflecting plate, the bottom frame including a horizontal plate contacting the reflecting plate and a sidewall perpendicular to the horizontal plate, the sidewall contacting the LED housing; and a top frame covering a front edge portion of the liquid crystal panel, the top frame, the main frame and the bottom frame coupled to each other.

11 Claims, 7 Drawing Sheets

LIQUID CRYSTAL DISPLAY DEVICE INCLUDING BACKLIGHT UNIT

This application claims the benefit of Korean Patent Application No. 10-2010-0074126, filed on Jul. 30, 2010, which is hereby incorporated by reference in its entirety.

BACKGROUND OF THE INVENTION

1. Field of the Invention

The present invention relates to a liquid crystal display device, and more particularly, to a liquid crystal display device including a light emitting diode (LED) backlight unit where a heat is effectively dissipated.

2. Discussion of the Related Art

A liquid crystal display (LCD) device that has been widely used for a television or a monitor because of its superiority in displaying a moving image and high contrast ratio produces images by using optical anisotropy and polarization properties of liquid crystal molecules. The LCD device includes a liquid crystal panel that is composed of facing two substrates and a liquid crystal layer between the two substrates. An alignment direction of liquid crystal molecules in the liquid crystal panel is changed by an electric field so that the liquid crystal panel can produce difference in transmittance.

Since the LCD device is a non-emissive type display device, an additional light source is required. Accordingly, a backlight unit including a light source is disposed under the liquid crystal panel. Here, one of a cold cathode fluorescent lamp (CCFL), an external electrode fluorescent lamp (EEFL) and a light emitting diode (LED) may be used as the light source. Specifically, the LED has been widely used as a light source for a display device because of its advantages such as small size, low power consumption and high reliability.

Figure 1:
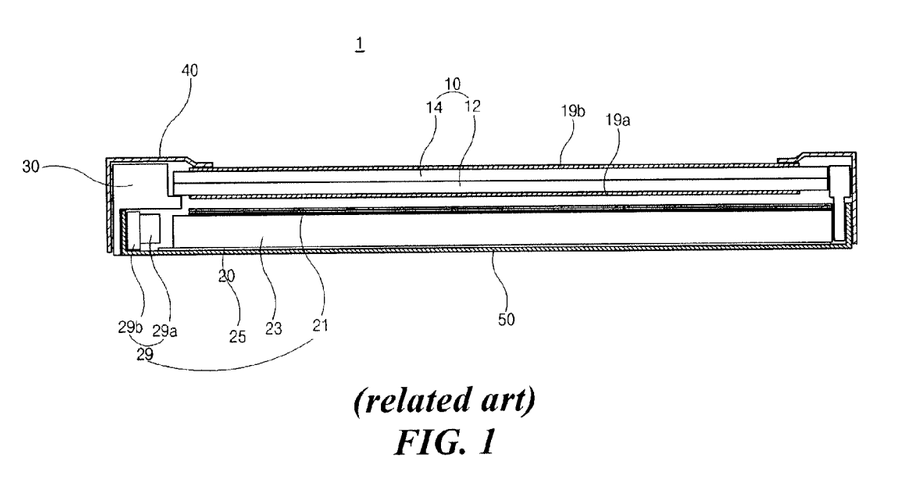
FIG. 1 is a cross-sectional view showing a liquid crystal display device including a light emitting diode backlight unit according to the related art.

FIG. 1 is a cross-sectional view showing a liquid crystal display device including a light emitting diode backlight unit according to the related art. In FIG. 1, a liquid crystal display (LCD) device 1 includes a liquid crystal panel 10, a backlight unit 20, a main frame 30, a top frame 40 and a bottom frame 50.

The liquid crystal panel 10 displaying an image includes first and second substrates 12 and 14 facing and spaced apart from each other and a liquid crystal layer interposed therebetween. The liquid crystal panel 10 further includes first and second polarizing plates 19a and 19b on outer surfaces of the first and second substrates 12 and 14, respectively. The backlight unit 20 is disposed under the liquid crystal panel 10. The backlight unit 20 includes a light emitting diode (LED) assembly 29, a reflecting plate 25, a light guide plate 23 and a plurality of optical sheets 21. The LED assembly 29 is disposed along at least one side of the main frame 30 and the reflecting plate 25 having a white color or a silver color is disposed over the bottom frame 50. In addition, the light guide plate 23 is disposed over the reflecting plate 25 and the plurality of optical sheets 21 are disposed over the light guide plate 23.

The LED assembly 29 disposed on a side of the light guide plate 23 includes a plurality of LEDs 29a emitting a white-colored light and an LED printed circuit board (PCB) 29b where the plurality of LEDs 29a are formed.

The liquid crystal panel 10 and the backlight unit 20 are integrated by the main frame 30, the top frame 40 and the bottom frame 50. The main frame 30 having a rectangular ring shape surrounds an edge portion of the liquid crystal panel 10 and the backlight unit 20. In addition, the top frame 40 covers a front edge portion of the liquid crystal panel 10 and the bottom frame 50 covers a rear surface of the backlight unit 20.

A temperature of the plurality of LEDs 29a increases according to an operating time and a brightness of the plurality of LEDs 29a is changed according to the temperature of the plurality of LEDs 29a. For example, the brightness of the plurality of LEDs 29a decreases as the temperature of the plurality of LEDs 29a increases. Accordingly, a heat dissipation design is required for the backlight unit 20 including the plurality of LEDs 29a to prevent reduction in brightness.

However, since the LCD device 1 according to the related art does not include an effective heat dissipation structure where a heat of high temperature is rapidly released to exterior, the temperature of the plurality of LEDs 29a increases and the brightness of the plurality of LEDs 29a is reduced during operation. As a result, a display quality of the LCD device 1 is deteriorated.

SUMMARY OF THE INVENTION

Accordingly, the present invention is directed to a liquid crystal display device including a backlight unit that substantially obviate one or more of the problems due to limitations and disadvantages of the related art.

An advantage of the present invention is to provide a liquid crystal display device including a backlight unit where a heat from a light emitting diode is effectively dissipated.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a main frame having a rectangular ring shape; a reflecting plate on the main frame; a light guide plate on the reflecting plate; a light emitting diode (LED) assembly along at least one side of the main frame, the LED assembly having a plurality of LEDs and an LED printed circuit board (PCB), the LED PCB including a first portion having the plurality of LEDs thereon and a second portion perpendicular to the first portion; an LED housing contacting the LED PCB; a plurality of optical sheets on the light guide plate; a liquid crystal panel on the plurality of optical sheets; a bottom frame under the reflecting plate, the bottom frame including a horizontal plate contacting the reflecting plate and a sidewall perpendicular to the horizontal plate, the sidewall contacting the LED housing; and a top frame covering a front edge portion of the liquid crystal panel, the top frame, the main frame and the bottom frame coupled to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 2:
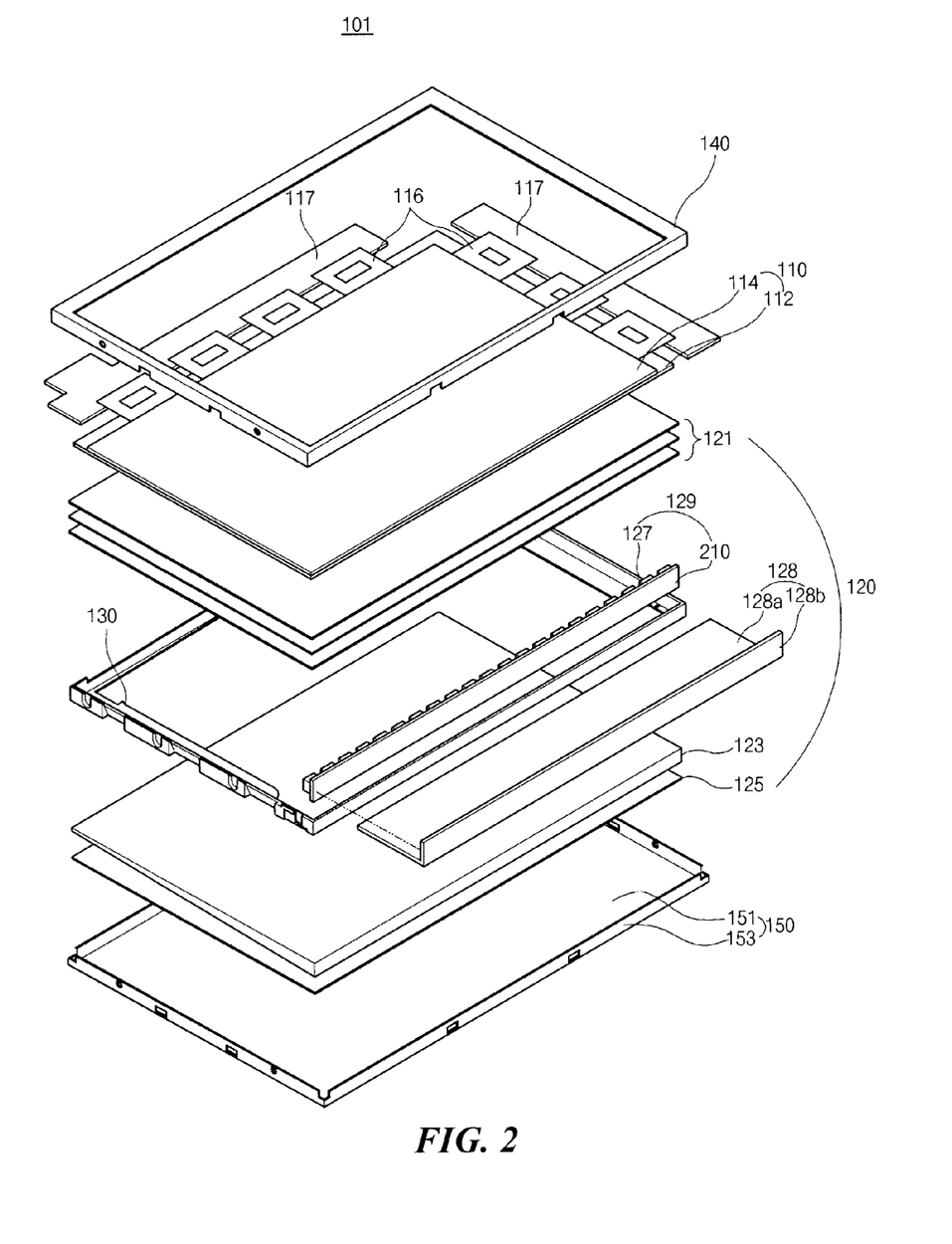
FIG. 2 is an exploded perspective view showing a liquid crystal display device according to a first embodiment of the present invention.

FIG. 2 is an exploded perspective view showing a liquid crystal display device according to a first embodiment of the present invention.

In FIG. 2, a liquid crystal display (LCD) device 101 includes a liquid crystal panel 110, a backlight unit 120, a main frame 130, a top frame 140 and a bottom frame 150. The liquid crystal panel 110 and the backlight unit 120 are surrounded and integrated by the main frame 130, the top frame 140 and the bottom frame 150.

The liquid crystal panel 110 displaying an image includes first and second substrates 112 and 114 facing and spaced apart from each other and a liquid crystal layer (not shown) interposed therebetween. Although not shown, when the liquid crystal panel 110 has an active matrix type, a gate line, a data line, a thin film transistor (TFT) and a pixel electrode are formed on an inner surface of the first substrate 112 referred to as a lower substrate or an array substrate and a color filter layer, a black matrix and a common electrode are formed on an inner surface of the second substrate 114 referred to as an upper substrate or a color filter substrate. The gate line and the data line cross each other to define a pixel region and the TFT is connected to the gate line and the data line. In addition, the pixel electrode is connected to the TFT. The color filter layer includes red, green and blue color filters each corresponding to the pixel region and the black matrix covers the gate line, the data line and the TFT. In addition, the common electrode is formed on the color filter layer and the black matrix. Moreover, first and second polarizing plates (not shown) where a predetermined polarized light selectively passes may be formed on outer surfaces of the first and second substrates 112 and 114, respectively.

A printed circuit board (PCB) 117 is connected to at least one side of the liquid crystal panel 110 through a connecting means 116 such as a flexible circuit board (FPC) or a tape carrier package (TCP). The PCB 117 may be bent toward a side surface or a rear surface of the main frame 130 during integration.

When the TFT connected to the gate line is turned on by a gate signal of a gate driving circuit, a data signal of a data driving circuit is applied to the pixel electrode through the data line and an alignment direction of liquid crystal molecules of the liquid crystal layer is changed by an electric field generated between the pixel electrode and the common electrode. As a result, the liquid crystal panel 110 produces transmittance difference and displays images.

The backlight unit 120 supplying a light to the liquid crystal panel 110 is disposed under the liquid crystal panel 110. The backlight unit 120 includes a light emitting diode (LED) assembly 129, a reflecting plate 125, a light guide plate 123 and a plurality of optical sheets 121. The LED assembly 129 is disposed along at least one side of the main frame 130 and the reflecting plate 125 having a white color or a silver color is disposed over the bottom frame 150. In addition, the light guide plate 123 is disposed over the reflecting plate 125 and the plurality of optical sheets 121 are disposed over the light guide plate 123.

The LED assembly 129 disposed on a side of the light guide plate 123 includes a plurality of LEDs 127 and an LED printed circuit board (PCB) 200 where the plurality of LEDs 127 are separately disposed. Each of the plurality of LEDs 127 may include an LED chip emitting red-colored, green-colored and blue-colored lights or a white-colored light and emit a white-colored light to an incident surface of the light guide plate 123. Alternatively, the plurality of LEDs 127 may include a plurality of red LEDs, a plurality of green LEDs and a plurality of blue LEDs and emit a white-colored light by turning on the red, green and blue LEDs at the same time.

The plurality of LEDs 127 radiates a heat and a temperature of the plurality of LEDs 127 increases according to an operating time. In addition, a brightness and a lifetime of the plurality of LEDs 127 are changed according to the temperature of the plurality of LEDs 127. For example, the brightness and the lifetime of the plurality of LEDs 127 may decrease as the temperature of the plurality of LEDs 127 increases. Accordingly, a heat dissipation design is applied to the backlight unit 120 including the plurality of LEDs 127 to prevent reduction in brightness and lifetime.

As a result, the backlight unit 120 further includes an LED housing 128. The LED housing 128 includes a horizontal portion 128a and a vertical portion 128b that cover bottom and side surfaces of the LED assembly 129, respectively, and has an "L" shape including a bent portion in a cross-sectional view. In addition, the LED housing 128 may include a metallic material having a relatively high thermal conductance. For example, the LED housing 128 may be formed of aluminum (Al) having a purity of about 99.5% and an oxide layer such as aluminum oxide ($Al_2O_3$) having a black color may be formed on a surface of the LED housing 128 by anodization. Since the black-colored oxide layer is formed on the surface of the LED housing 128, a heat absorption rate of the LED housing 128 increases and an amount of heat dissipation of the LED housing 128 increases.

The heat from the LED assembly 129 is transmitted to and is effectively diffused in the entire LED housing 128. Accordingly, the heat from the LED assembly 129 is rapidly and effectively transmitted to the bottom frame 150 through the LED housing 128.

In the backlight unit 120, specifically, since the LED PCB 200 where the plurality of LEDs 127 are formed contacts the LED housing 128 with a larger area, the heat from the plurality of LEDs 127 is rapidly and effectively dissipated. For attachment and heat transmission, a thermal pad having a relatively high thermal conductance may be formed between the LED PCB 200 and the LED housing 128. Accordingly, the LED PCB 200 includes a first portion 210 where the plurality of LEDs 127 are formed and a second portion 220 perpendicular to the first portion 210. Since the LED PCB 200 is enlarged to have the first and second portions 210 and 220, the contact area of the LED PCB 200 and the LED housing 128 increases so that the heat from the plurality of LEDs 127 can be rapidly and effectively dissipated to the exterior and the increase in temperature due to the plurality of LEDs 127 can be minimized in the LCD device 101.

The light emitted from the plurality of LEDs 127 enters the light guide plate 123 and is uniformly diffused in the whole light guide plate 123 by total reflection so that a planar light can be supplied to the liquid crystal panel 110. For the purpose of supplying a uniform planar light, the light guide plate 123 includes a uniformity pattern on a rear surface thereof. For example, one of an elliptical pattern, a polygonal pattern and a hologram pattern may be formed on the rear surface of the light guide plate 123 as the uniformity pattern to guide the light entering the light guide plate 123 and the uniformity pattern may be formed by a printing method or an injecting method.

The reflecting plate 125 under the rear surface of the light guide plate 123 reflects the light penetrating the rear surface of the light guide plate 123 toward the liquid crystal panel 110 to improve brightness and efficiency of the light. The plurality of optical sheets 121 over the light guide plate 123 may include a diffusing sheet and at least one collimating sheet. The plurality of optical sheets 121 may diffuse or collimate the light passing through the light guide plate 123 to improve uniformity of the planar light.

The liquid crystal panel 110 and the backlight unit 120 are integrated by the main frame 130, the top frame 140 and the bottom frame 150. The top frame 140 has a rectangular ring shape whose cross-section is an "L" shape having a bent portion to cover front and side surfaces of the liquid crystal panel 110. Since a central portion of the liquid crystal panel 110 is exposed through the top frame 140, an image of the liquid crystal panel 110 is displayed through the top frame 140.

The bottom frame 150 functions as a base plate for integration where the liquid crystal panel 110 and the backlight unit 120 are disposed and has a rectangular plate shape whose edge portion is perpendicularly bent. Accordingly, the bottom frame 150 includes a horizontal plate 151 contacting a rear surface of the backlight unit 120 and a sidewall 153 perpendicularly upwardly bent from an edge portion of the horizontal plate 151.

The main frame 130 has rectangular ring shape whose one side is removed to surround the edge portion of the liquid crystal panel 110 and the backlight unit 120. The main frame 130 is coupled to the top frame 140 and the bottom frame 150.

The main frame may be referred to as a guide panel, a main support or a mold frame and the top frame 140 may be referred to as a top case or a case top. In addition, the bottom frame 150 may be referred to as a bottom cover or a lower cover.

In the backlight unit 120 referred to as a side light type, the plurality of LEDs 127 may be disposed as a plurality of rows on the LED PCB 200. Further, a plurality of LED assemblies 129 may be disposed along a plurality of sides of the bottom frame 150.

In the LCD device 101, the heat from the plurality of LEDs 127 is dissipated to the exterior due to the heat dissipation design of the LED assembly 129 rapidly and effectively.

Figure 3A:
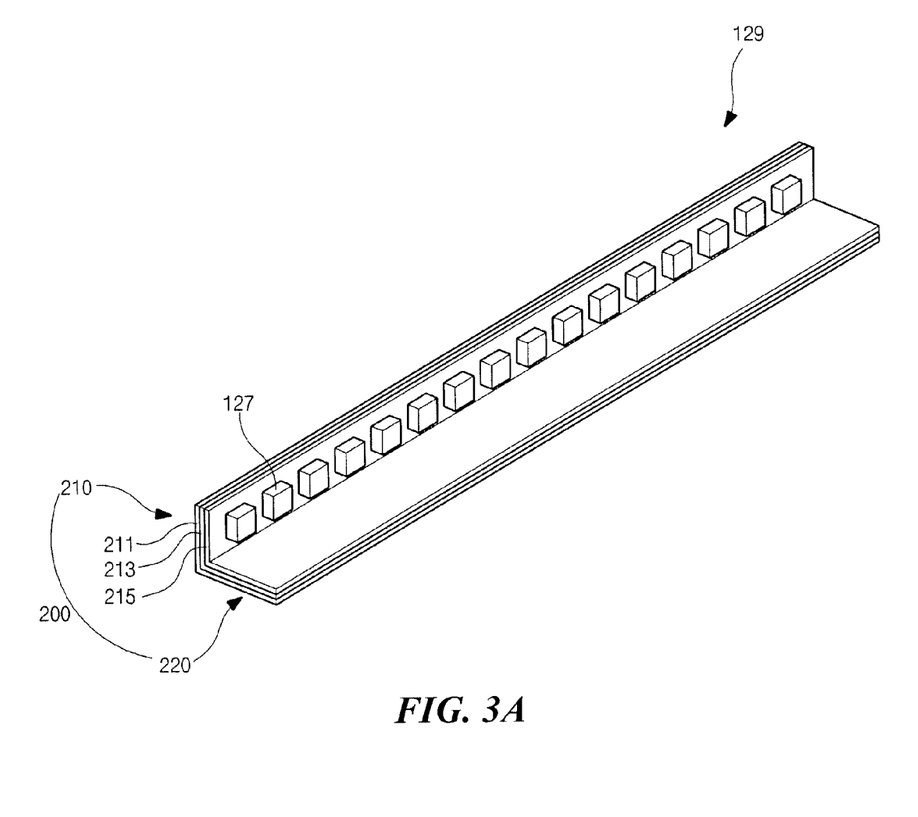
FIGS. 3A and 3B are perspective views showing a light emitting diode assembly of a backlight unit according to first and second embodiments, respectively, of the present invention.
Figure 3B:
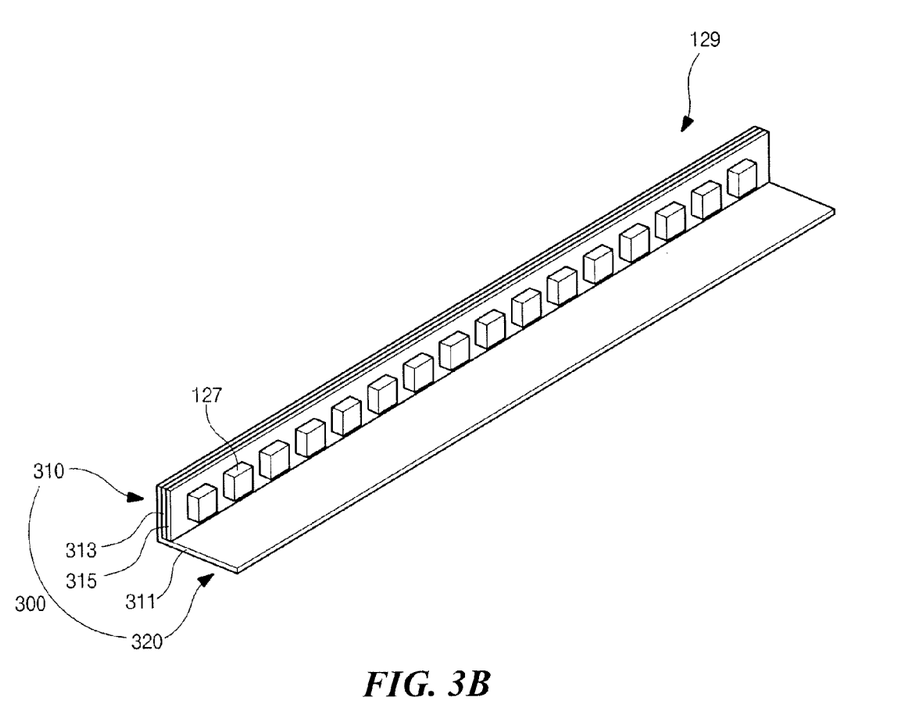

FIGS. 3A and 3B are perspective views showing a light emitting diode assembly of a backlight unit according to first and second embodiments, respectively, of the present invention.

In FIG. 3A, the LED PCB 200 may include one of an FR-4 (flame retardant composition 4) PCB having a heat conduction material, a metal printed circuit board (MPCB) or a metal core printed circuit board (MCPCB). The plurality of LEDs 127 are disposed along a longer side of the LED PCB 200 and are spaced apart from each other. The LED PCB 200 includes a base layer 211, an insulating layer 213 and a conductive layer 215.

The base layer 211 has and supports the insulating layer 213 and the conductive layer 215 thereon. In addition, the base layer 211 dissipates the heat radiated from the plurality of LEDs 127. For example, the base layer 211 may include a metallic material having a relatively high heat conductivity such as aluminum (Al) and copper (Cu).

The insulating layer 213 on the base layer 211 electrically isolates the base layer 211 and the conductive layer 215. For example, the insulating layer 213 may include an epoxy resin or an epoxy ceramic having a relatively high resistance and a relatively high thermal conductance.

The conductive layer 215 on the insulating layer 213 includes a plurality of conductive lines for transmitting a source power or an electric signal. For example, the plurality of conductive lines may include a metallic material such as copper (Cu). The plurality of conductive lines may be electrically connected to the plurality of LEDs 127.

The LED PCB 200 includes the first portion 210 facing the incident surface of the light guide plate 123 (of FIG. 2) and the second portion 220 facing the rear surface of the light guide plate 123. The plurality of LEDs 127 are formed on the first portion 210. The first and second portions 210 and 220 are substantially perpendicular to each other to have an "L" shape including a bent portion in a cross-sectional view. Each of the first and second portions 210 and 220 includes the base layer 211, the insulating layer 213 and the conductive layer 215.

In addition, the first and second portions 210 and 220 of the LED PCB 200 contact the vertical and horizontal portions 128b and 128a (of FIG. 2) of the LED housing 128 (of FIG. 2), respectively. As the contact area between the LED PCB 200 and the LED housing 128 is enlarged, the heat from the plurality of LEDs 127 is dissipated more rapidly and more effectively. When the contact area between first portion 210 of the LED PCB 200 and the vertical portion 128b of the LED housing 128 is enlarged, a thickness of the LCD device 101 increases. Accordingly, as compared with the related art, the contact area between the first portion 210 and the vertical portion 128b is not enlarged and the contact area between the second portion 220 and the horizontal portion 128a is enlarged. For example, the area or the width of the second portion 220 may be greater than the area or the width of the first portion 210, and the contact area between the second portion 220 and the horizontal portion 128a may be greater than the contact area between the first portion 210 and the vertical portion 128b.

In FIG. 3B, the LED PCB 300 may include one of an FR-4 (flame retardant composition 4) PCB having a heat conduction material, a metal printed circuit board (MPCB) or a metal core printed circuit board (MCPCB). The plurality of LEDs 127 are disposed along a longer side of the LED PCB 300 and are spaced apart from each other.

The LED PCB 300 includes a first portion 310 facing the incident surface of the light guide plate 123 (of FIG. 2) and the second portion 320 facing the rear surface of the light guide plate 123. The plurality of LEDs 127 are formed on the first portion 310. The first and second portions 310 and 320 are substantially perpendicular to each other to have an "L" shape including a bent portion in a cross-sectional view.

Here, while the first portion 310 includes a base layer 311, an insulating layer 313 and a conductive layer 315, the second portion 320 includes only the base layer 311. Accordingly, the base layer 311 is bent to have the first portion 310 and the second portion 320, and each of the insulating layer 313 and the conductive layer 315 has a plate shape. In addition, the insulating layer 313 and the conductive layer 315 are formed on the first portion 310 of the base layer 311, and the second portion 320 of the base layer 311 is exposed.

The base layer 311 dissipates the heat radiated from the plurality of LEDs 127. For example, the base layer 311 may include a metallic material having a relatively high heat conductivity such as aluminum (Al) and copper (Cu). The insulating layer 313 electrically isolates the base layer 311 and the conductive layer 315. For example, the insulating layer 313 may include an epoxy resin or an epoxy ceramic having a relatively high resistance and a relatively high thermal conductance. The conductive layer 315 includes a plurality of conductive lines for transmitting a source power or an electric signal. For example, the plurality of conductive lines may include a metallic material such as copper (Cu). The plurality of conductive lines may be electrically connected to the plurality of LEDs 127.

The first and second portions 310 and 320 of the LED PCB 300 contact the vertical and horizontal portions 128b and 128a (of FIG. 2) of the LED housing 128 (of FIG. 2), respectively. As the contact area between the LED PCB 300 and the LED housing 128 is enlarged, the heat from the plurality of LEDs 127 is dissipated more rapidly and more effectively. When the contact area between first portion 310 of the LED PCB 300 and the vertical portion 128b of the LED housing 128 is enlarged, a thickness of the LCD device 101 increases. Accordingly, as compared with the related art, the contact area between the first portion 310 and the vertical portion 128b is not enlarged and the contact area between the second portion 320 and the horizontal portion 128a is enlarged. For example, the area or the width of the second portion 320 may be greater than the area or the width of the first portion 310, and the contact area between the second portion 320 and the horizontal portion 128a may be greater than the contact area between the first portion 310 and the vertical portion 128b.

Figure 4:
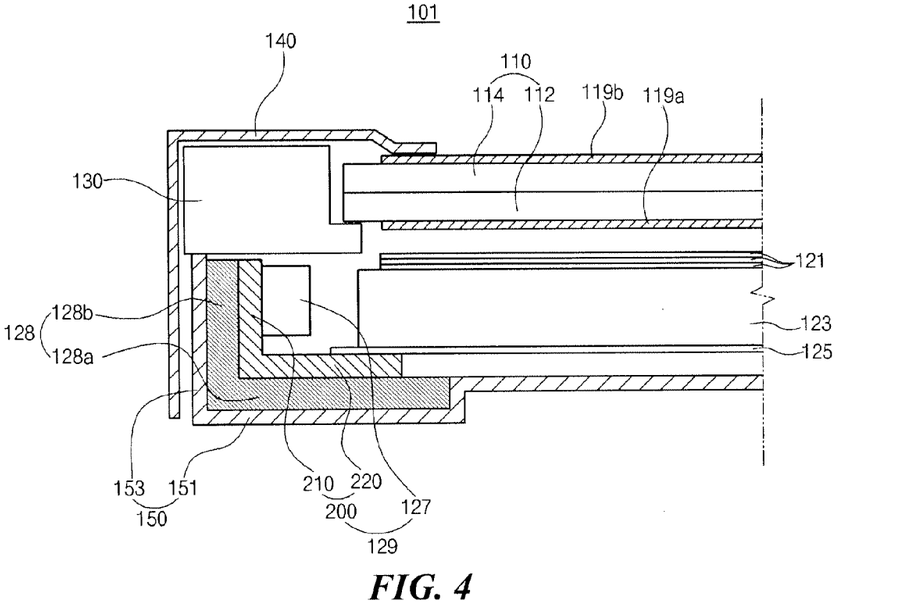
FIG. 4 is a cross-sectional view showing a liquid crystal display device according to a first embodiment of the present invention.
Figure 5:
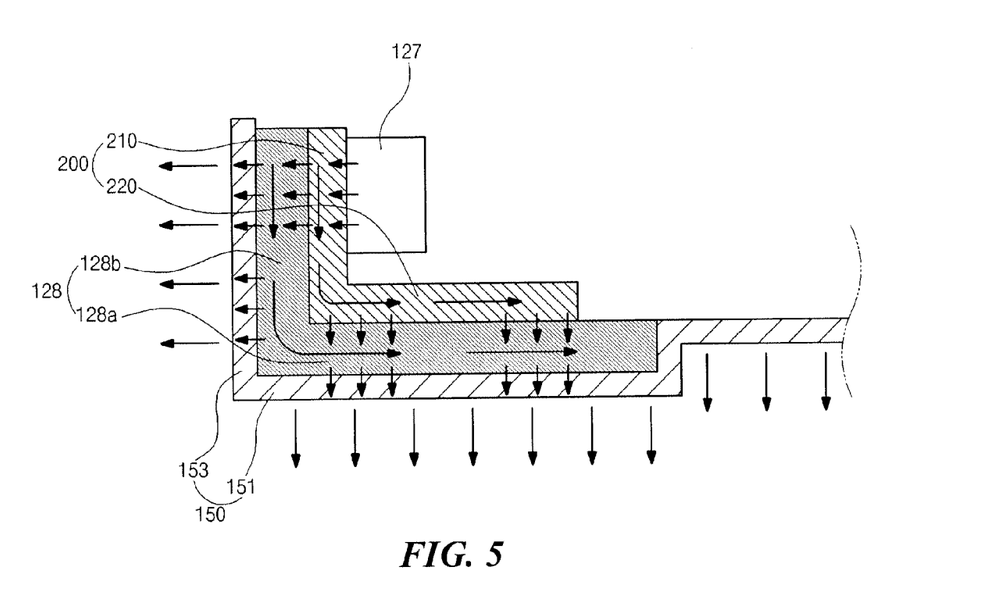
FIG. 5 is a cross-sectional view showing a heat transmission path in a liquid crystal display device according to a first embodiment of the present invention.

FIG. 4 is a cross-sectional view showing a liquid crystal display device according to a first embodiment of the present invention, and FIG. 5 is a cross-sectional view showing a heat transmission path in a liquid crystal display device according to a first embodiment of the present invention.

In FIGS. 4 and 5, the reflecting plate 125, the light guide plate 123, the LED assembly 129 and the plurality of optical sheets 121 constitute the backlight unit 120 (of FIG. 2). In addition, the liquid crystal panel 110 including the first and second substrates 112 and 114 and the liquid crystal layer (not shown) therebetween is disposed over the backlight unit 120. The first and second polarizing plates 119a and 119b are formed on the outer surfaces of the first and second substrates 112 and 114, respectively. The backlight unit 120 and the liquid crystal panel 110 are surrounded by the main frame 130, and the bottom frame 150 including the horizontal plate 151 and the sidewall 153 is coupled to the rear surface of the backlight unit 120. In addition, the top frame 140 covering the front edge portion of the liquid crystal panel 110 is coupled to the main frame 130 and the bottom frame 150.

The plurality of LEDs 127 separately disposed on the LED PCB 200 are supplied with the source power from an external circuit. The LED PCB 200 includes the first portion 210 where the plurality of LEDs 127 are formed and the second portion 220 perpendicular to the first portion 210. In addition, the LED housing 128 includes the horizontal portion 128a and the vertical portion 128b. The LED assembly 129 is disposed on the LED housing 128 such that the first and second portions 210 and 220 respectively contact the vertical and horizontal portions 128b and 128a.

The LED assembly 129 is fixed to the LED housing 128 with an adhesive. For example, a double-sided tape may be formed between the first portion 210 and the vertical portion 128b. Alternatively, a thermal tape having a relatively high thermal conductance may be formed between the first portion 210 and the vertical portion 128b for more rapid and more effective heat dissipation. In addition, an additional adhesive may be formed between the second portion 220 and the horizontal portion 128a. Accordingly, side and rear surfaces of the LED assembly 129 are guided by the LED housing 128. In addition, the horizontal portion 128a of the LED housing 128 contacts the horizontal plate 151 of the bottom frame 150 and the vertical portion 128b of the LED housing 128 contacts the sidewall 153 of the bottom frame 150.

As a result, the heat radiated from the plurality of LEDs 127 is transmitted to the LED housing 128 through the LED PCB 200 and the heat of the LED housing 128 is transmitted to the bottom frame 150, thereby dissipated into the exterior.

Here, the heat radiated from the plurality of LEDs 127 is transmitted to the first portion 210 of the LED PCB 200 and the heat of the first portion 210 is diffused to the second portion 220 of the LED PCB 200. Accordingly, the heat of the plurality of LEDs 127 is diffused to the whole LED PCB 200. Since the first and second portions 210 and 220 contact the vertical and horizontal portions 128b and 128a, the heat of the whole LED PCB 200 is transmitted to the whole LED housing 128. In addition, since the horizontal and vertical portions 128a and 128b contact the horizontal plate 151 and the sidewall 153, the heat of the whole LED housing 128 is transmitted to the bottom frame 150. The heat transmitted to the bottom frame 150 is diffused to the whole bottom frame 150 and the heat of the bottom frame 150 is dissipated into the exterior through the whole bottom frame 150.

As a result, the heat of the plurality of LEDs 127 is transmitted to the exterior through an outer surface of the whole bottom frame 150. Since the first and second portions 210 and 220 contact the vertical and horizontal portions 128b and 128a, the contact area between the LED PCB 200 and the LED housing 129 is enlarged and the heat of the plurality of LEDs 127 is dissipated into the exterior rapidly and effectively. Accordingly, reduction in lifetime and brightness of the plurality of LEDs 127 is prevented and display quality is improved.

Figure 6A:
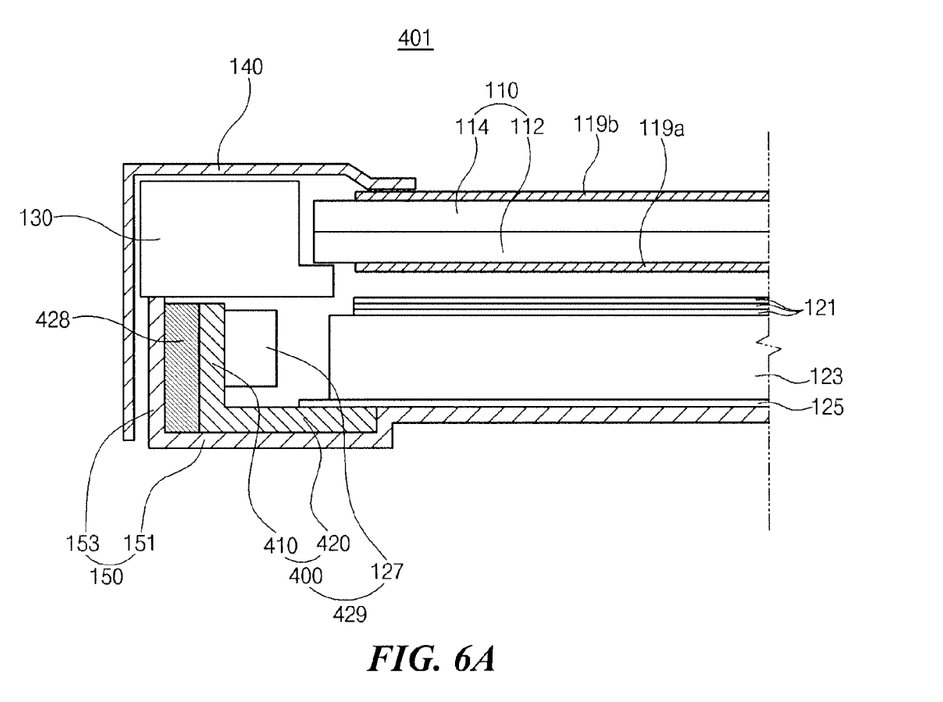
FIGS. 6A and 6B are cross-sectional views showing a liquid crystal display device according to third and fourth embodiments, respectively, of the present invention.
Figure 6B:
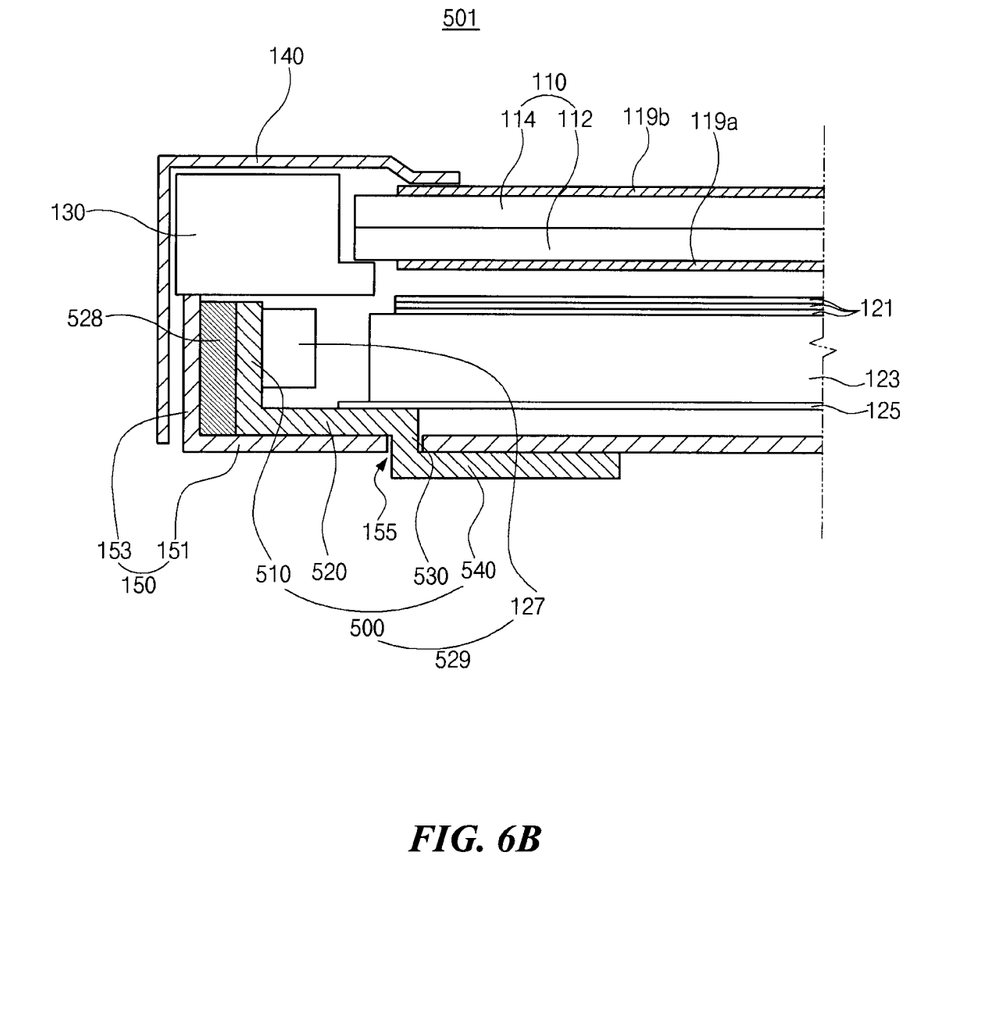

FIGS. 6A and 6B are cross-sectional views showing a liquid crystal display device according to third and fourth embodiments, respectively, of the present invention.

In FIG. 6A, a reflecting plate 125, a light guide plate 123, an LED housing 428, an LED assembly 429 and the plurality of optical sheets 121 constitute a backlight unit 120 (of FIG. 2). In addition, a liquid crystal panel 110 including first and second substrates 112 and 114 and liquid crystal layer (not shown) therebetween is disposed over the backlight unit 120. First and second polarizing plates 119a and 119b are formed on outer surfaces of the first and second substrates 112 and 114, respectively. The backlight unit 120 and the liquid crystal panel 110 are surrounded by a main frame 130, and a bottom frame 150 including a horizontal plate 151 and a sidewall 153 is coupled to the rear surface of the backlight unit 120. In addition, a top frame 140 covering a front edge portion of the liquid crystal panel 110 is coupled to the main frame 130 and the bottom frame 150.

The LED assembly 429 includes a plurality of LEDs 127 and an LED PCB 400. The plurality of LEDs 127 separately disposed on the LED PCB 400 are supplied with the source power from an external circuit. The LED PCB 400 includes a first portion 410 where the plurality of LEDs 127 are formed and a second portion 420 perpendicular to the first portion 410. In addition, the LED housing 428 having a plate shape without a bent portion is disposed between the first portion 410 of the LED PCB 400 and the sidewall 153 of the bottom frame 150. Accordingly, a rear surface of the first portion 410 contact the LED housing 429 and a rear surface of the second portion 420 contacts the horizontal plate 151 of the bottom frame 150. Further, the LED housing 428 contacts the sidewall 153 of the bottom frame 150.

The LED housing 428 may include a metallic material having a relatively high thermal conductance. For example, the LED housing 428 may be formed of aluminum (Al) having a purity of about 99.5% and an oxide layer such as aluminum oxide ($Al_2O_3$) having a black color may be formed on a surface of the LED housing 428 by anodization.

The LED assembly 429 may be fixed to the LED housing 428 with an adhesive. For example, a double-sided tape may be formed between the first portion 410 and the LED housing 428. Alternatively, a thermal tape having a relatively high thermal conductance may be formed between the first portion 410 and the LED housing 428 for more rapid and more effective heat dissipation.

The heat radiated from the plurality of LEDs 127 is transmitted to the LED housing 428 through the LED PCB 400 and the heat of the LED housing 428 is transmitted to the bottom frame 150. In addition, the heat radiated from the plurality of LEDs 127 is directly transmitted to the bottom frame 150.

Here, the heat radiated from the plurality of LEDs 127 is transmitted to the first portion 410 of the LED PCB 400 and the heat of the first portion 410 is diffused to the second portion 420 of the LED PCB 400. Accordingly, the heat of the plurality of LEDs 127 is diffused to the whole LED PCB 400.

Since the first portion 410 contacts the LED housing 428 and the LED housing 428 contacts the sidewall 153, the heat of the LED PCB 400 is transmitted to the bottom frame 150 through the LED housing 428. In addition, since the second portion 420 contacts the horizontal plate 151, the heat of the LED PCB 400 is transmitted to the bottom frame 150. The heat transmitted to the bottom frame 150 is diffused to the whole region of the bottom frame 150 and the heat of the bottom frame 150 is dissipated into the exterior through the whole bottom frame 150.

As a result, the heat of the plurality of LEDs 127 is transmitted to the exterior through an outer surface of the whole bottom frame 150. Since the first and second portions 410 and 420 contact the LED housing 428 and the bottom frame 150, the contact areas between the LED PCB 400 and the LED housing 129 and between the LED PCB 400 and the bottom frame 150 is enlarged and the heat of the plurality of LEDs 127 is dissipated into the exterior rapidly and effectively. Accordingly, reduction in lifetime and brightness of the plurality of LEDs 127 is prevented and display quality is improved.

In FIG. 6B, a reflecting plate 125, a light guide plate 123, an LED housing 528, an LED assembly 529 and the plurality of optical sheets 121 constitute a backlight unit 120 (of FIG. 2). In addition, a liquid crystal panel 110 including first and second substrates 112 and 114 and liquid crystal layer (not shown) therebetween is disposed over the backlight unit 120. First and second polarizing plates 119a and 119b are formed on outer surfaces of the first and second substrates 112 and 114, respectively. The backlight unit 120 and the liquid crystal panel 110 are surrounded by a main frame 130, and a bottom frame 150 including a horizontal plate 151 and a sidewall 153 is coupled to the rear surface of the backlight unit 120. In addition, a top frame 140 covering a front edge portion of the liquid crystal panel 110 is coupled to the main frame 130 and the bottom frame 150.

The LED assembly 529 includes a plurality of LEDs 127 and an LED PCB 500. The plurality of LEDs 127 separately disposed on the LED PCB 500 are supplied with the source power from an external circuit. The LED PCB 500 includes a first portion 510 where the plurality of LEDs 127 are formed, a second portion 520 that is perpendicular to the first portion 510 and contacts an inner surface of the horizontal plate 151, a third portion 530 that is perpendicular to the second portion 520 and penetrates a hole 155 of the horizontal plate 151 and a fourth portion 540 that is perpendicular to the third portion 530 and contacts an outer surface of the horizontal plate 151. The second and fourth portions 520 and 540 are connected through the third portion 530. Since the fourth portion 540 of the LED PCB 500 is exposed outside the bottom frame 150, the heat radiated from the plurality of LEDs 127 may be directly dissipated from the LED PCB 500 to the exterior.

In addition, the LED housing 528 having a plate shape without a bent portion is disposed between the first portion 510 of the LED PCB 500 and the sidewall 153 of the bottom frame 150. Accordingly, a rear surface of the first portion 510 contact the LED housing 529 and a rear surface of the second portion 520 contacts the horizontal plate 151 of the bottom frame 150. Further, the LED housing 528 contacts the sidewall 153 of the bottom frame 150.

The LED housing 528 may include a metallic material having a relatively high thermal conductance. For example, the LED housing 528 may be formed of aluminum (Al) having a purity of about 99.5% and an oxide layer such as aluminum oxide ($Al_2O_3$) having a black color may be formed on a surface of the LED housing 528 by anodization.

The LED assembly 529 may be fixed to the LED housing 528 with an adhesive. For example, a double-sided tape may be formed between the first portion 410 and the LED housing 528. Alternatively, a thermal tape having a relatively high thermal conductance may be formed between the first portion 510 and the LED housing 528 for more rapid and more effective heat dissipation.

The heat radiated from the plurality of LEDs 127 is transmitted to the LED housing 528 through the first portion 510 of the LED PCB 500 and the heat of the LED housing 528 is transmitted to the bottom frame 150. In addition, the heat radiated from the plurality of LEDs 127 is directly transmitted to the bottom frame 150 through the second portion 520 of the LED PCB 500. Further, the heat radiated from the plurality of LEDs 127 is directly dissipated to the exterior through the fourth portion 540 of the LED PCB 500.

Here, the heat radiated from the plurality of LEDs 127 is transmitted to the first portion 510 of the LED PCB 500 and the heat of the first portion 510 is diffused to the second, third and fourth portions 520, 530 and 540 of the LED PCB 500. Accordingly, the heat of the plurality of LEDs 127 is diffused to the whole LED PCB 500.

Since the first portion 510 contacts the LED housing 528 and the LED housing 528 contacts the sidewall 153, the heat of the LED PCB 500 is transmitted to the bottom frame 150 through the LED housing 528. In addition, since the second portion 520 contacts the horizontal plate 151, the heat of the LED PCB 500 is transmitted to the bottom frame 150. The heat transmitted to the bottom frame 150 is diffused to the whole region of the bottom frame 150 and the heat of the bottom frame 150 is dissipated into the exterior through the whole bottom frame 150. Further, since the fourth portion 540 is exposed to the exterior, the heat of the LED PCB 500 is directly dissipated into the exterior.

As a result, the heat of the plurality of LEDs 127 is transmitted to the exterior through an outer surface of the whole bottom frame 150 and is directly transmitted to the exterior through the fourth portion 540. Since the first and second portions 510 and 520 contact the LED housing 528 and the bottom frame 150, the contact areas between the LED PCB 500 and the LED housing 129 and between the LED PCB 500 and the bottom frame 150 is enlarged and the heat of the plurality of LEDs 127 is dissipated into the exterior rapidly and effectively. In addition, since the fourth portion 540 is exposed to the exterior, the heat of the plurality of LEDs 127 is dissipated into the exterior more rapidly and more effectively. Accordingly, reduction in lifetime and brightness of the plurality of LEDs 127 is prevented and display quality is improved.

Consequently, in a liquid crystal display device according to the present invention, an LED PCB of an LED assembly includes a first portion where a plurality of LEDs are formed and a second portion perpendicular to the first portion and an LED housing is disposed between the LED PCB and a bottom frame. Accordingly, an area for transmitting a heat of the plurality of LEDs to the exterior is enlarged and the heat of the plurality of LEDs is dissipated into the exterior rapidly and effectively. The LED housing may have an "L" shape with a bent portion or a plate shape without a bent portion. In addition, the LED PCB further includes a fourth portion connected to the second portion through a third portion and exposed to the exterior. Accordingly, the area for transmitting the heat of the plurality of LEDs to the exterior is further enlarged and the heat of the plurality of LEDs is dissipated into the exterior more rapidly and more effectively. As a result, reduction in lifetime and brightness of the plurality of LEDs is prevented and display quality is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a main frame having a rectangular ring shape;
a reflecting plate on the main frame;
a light guide plate on the reflecting plate;
a light emitting diode (LED) assembly along at least one side of the main frame, the LED assembly having a plurality of LEDs and an LED printed circuit board (PCB), the LED PCB including a first portion having the plurality of LEDs thereon and a second portion perpendicular to the first portion;
an LED housing contacting the LED PCB;
a plurality of optical sheets on the light guide plate;
a liquid crystal panel on the plurality of optical sheets;
a bottom frame under the reflecting plate, the bottom frame including a horizontal plate contacting the reflecting plate and a sidewall perpendicular to the horizontal plate, wherein the LED housing directly contacts the sidewall for transmitting a heat from the LED PCB to the sidewall; and
a top frame covering a front edge portion of the liquid crystal panel, the top frame, the main frame and the bottom frame coupled to each other,
wherein the LED housing includes only a single vertical portion and a horizontal portion perpendicular to and extending from the vertical portion,
wherein the single vertical portion of the LED housing directly contacts the first portion of the LED PCB and the sidewall of the bottom frame,
wherein the horizontal portion of the LED housing directly contacts the second portion of the LED PCB and the horizontal plate of the bottom frame,
wherein the first portion of the LED PCB includes a base layer directly contacting the LED housing, an insulating layer directly on the base layer, and a conductive layer on the insulating layer, and the second portion of the LED PCB includes only the base layer, and
wherein a contact area between the second portion of the LED PCB and the horizontal portion of the LED housing is greater than a contact area between the first portion of the LED PCB and the vertical portion of the LED housing.

2. The device according to claim 1, wherein the plurality of LEDs are separately disposed on the first portion of the LED PCB and the first portion facing a side surface of the light guide plate.

3. The device according to claim 1, wherein each of the base layer and the conductive layer includes a metallic material and the insulating layer includes one of an epoxy resin and an epoxy ceramic.

4. The device according to claim 1, wherein the LED PCB includes one of an FR-4 (flame retardant composition 4) PCB having a heat conduction material, a metal printed circuit board (MPCB) or a metal core printed circuit board (MCPCB).

5. The device according to claim 1, wherein an area of the second portion of the LED PCB is greater than an area of the first portion of the LED PCB.

6. The device according to claim 1, wherein the LED assembly is fixed to the LED housing with an adhesive.

7. The device according to claim 1, wherein the LED housing includes a metal, and a surface of the LED housing is formed with an inorganic oxide layer.

8. The device according to claim 7, wherein the inorganic oxide layer has a black color.

9. A liquid crystal display device, comprising:
a main frame having a rectangular ring shape;
a reflecting plate on the main frame;
a light guide plate on the reflecting plate;
a light emitting diode (LED) assembly along at least one side of the main frame, the LED assembly having a plurality of LEDs and an LED printed circuit board (PCB), the LED PCB including a first portion having the plurality of LEDs thereon and a second portion perpendicular to the first portion;
an LED housing contacting the LED PCB;
a plurality of optical sheets on the light guide plate;
a liquid crystal panel on the plurality of optical sheets;
a bottom frame under the reflecting plate, the bottom frame including a horizontal plate contacting the reflecting plate and a sidewall perpendicular to the horizontal plate, wherein the LED housing directly contacts the sidewall for transmitting a heat from the LED PCB to the sidewall; and
a top frame covering a front edge portion of the liquid crystal panel, the top frame, the main frame and the bottom frame coupled to each other,
wherein the LED housing includes only a single vertical portion, wherein the single vertical portion of the LED housing directly contacts the first portion of the LED PCB and the sidewall of the bottom frame, wherein the second portion of the LED PCB directly contacts the horizontal plate of the bottom frame and the single vertical portion, wherein the horizontal plate of the bottom frame includes a hole, wherein the LED PCB further includes a third portion penetrating the hole of the bottom frame, and a fourth portion perpendicular to the third portion, wherein the first portion of the LED PCB includes a base layer directly contacting the LED housing, an insulating layer directly on the base layer, and a conductive layer on the insulating layer, and the second portion of the LED PCB includes only the base layer, and wherein the conductive layer includes a plurality of conductive lines electrically connected to the plurality of LEDs.

10. The device according to claim 9, wherein the fourth portion of the LED PCB is exposed under the horizontal plate of the bottom frame.

11. The device according to claim 9, wherein the fourth portion of the LED PCB contacts an outer surface of the horizontal plate of the bottom frame.

* * * * *